July 25, 1967 W. E. SCHULZ 3,332,311
ELECTRICALLY FIRED EXPLOSIVE FASTENERS
Filed Jan. 19, 1966
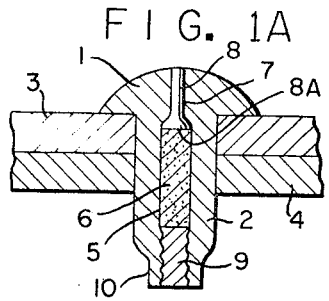
FIG. 1A
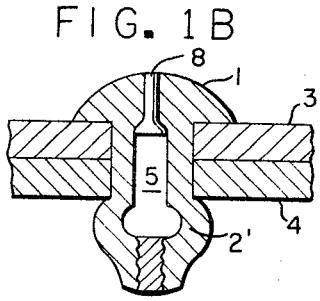
FIG. 1B
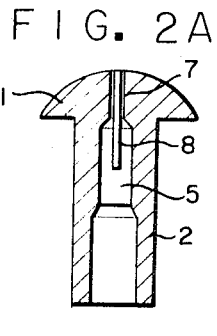
FIG. 2A
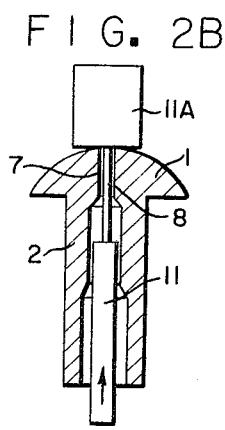
FIG. 2B
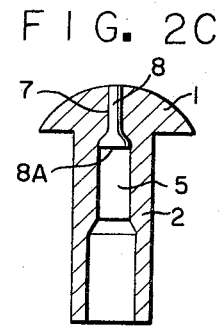
FIG. 2C
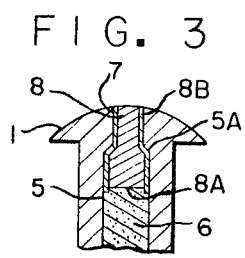
FIG. 3
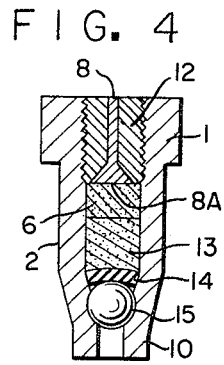
FIG. 4
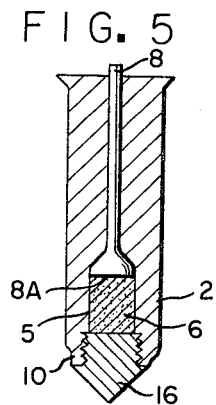
FIG. 5
INVENTOR
WILLIAM E. SCHULZ
BY
ATTORNEY

United States Patent Office 3,332,311
Patented July 25, 1967

3,332,311
ELECTRICALLY FIRED EXPLOSIVE FASTENERS
William E. Schulz, Wenonah, N.J., assignor to E. I. du Pont de Nemours and Company, Wilmington, Del., a corporation of Delaware
Filed Jan. 19, 1966, Ser. No. 521,599
11 Claims. (Cl. 85—65)

This application is a continuation-in-part of my U.S. application Ser. No. 393,550, filed Sept. 1, 1964 and now abandoned.

This invention relates to explosively actuated fasteners (sometimes called explosive fasteners) and more particularly is directed to electrically fired, explosively-actuated fasteners which respond instant to a relatively low electric firing current.

As used herein, the term "fastener" includes any means for connecting two or more elements, including, for example, rivets, bolts, screws, nails, pins, etc.

Fasteners, such as rivets, containing an explosive charge in the shank portion thereof have been known and used in the art for many years for the fastening of metal components such as metal plates which are inaccessible from one side. For this reason, they are often referred to in the trade as "blind" fasteners. Characteristically, such fasteners include a head portion and a shank portion having a central longitudinal recess, i.e., cavity. The explosive charge is loaded in this recess. In use, the shank of the fastener is pressed through aligned holes in two pieces which are to be joined. Conventionally, heat is then applied to the head of the fastener; conduction of heat through the head portion brings about detonation of the explosive charge. Expansion of the shank in response to this detonation is severe enough to lock the pieces to be joined firmly together but not sufficient to split or rupture the fastener body.

Explosively-actuated (explosively-expanded) rivets are in wide-spread use in the fastening of skin to airplane bodies and in the assembly of refrigerators, vehicle bodies and similar heavy-duty objects. One of the limitations of the use of explosively actuated fasteners is the slowness of their response, e.g., in many cases there is a lag of up to several seconds between the time heat is applied to the head of the rivet and actuation of the explosive charge. This is particularly true where a number of fasteners are to be heated and where the fastener must have high shear strength over a considerable extent of its length and thus the solid portion of its shank is relatively long, thereby providing greater resistance to heat conduction. In many production lines, this lag cannot be tolerated; consequently there is a well-recognized need for an explosively-actuated fastener in which the functioning time is reduced, e.g., to ⅕ of a second or less. An additional disadvantage has been that with some fasteners it is necessary to overheat the head excessively in order to cause heat to flow to the vicinity of the explosive rapidly enough to detonate it successfully.

Representative of attempts to develop explosively-actuated fasteners having shorter response times is that described in U.S. Patent 2,387,742, which relates to explosively-actuated fasteners wherein the explosive charge is a detonating explosive such as lead styphnate, copper acetylide, silver azide, etc. Detonation of this explosive charge is effected by spark discharge and the like therethrough, preferably by means of an electrical conductor which is simply inserted into the cavity of the fastener and connected to a source of high voltage electricity. The electrical conductor desirably is insulated except at its terminal point in the explosive charge. With this conductor close to the bottom of the fastener cavity, the circuit is closed and a spark jumps across the gap between the conductor and the metal of the grounded fastener body thereby actuating the explosive charge. Although an explosively-actuated fastener having this type of firing mechanism would appear a likely candidate for use in applications where a rapid response is required, it has never been commercialized because: (a) the high voltage discharges required to form the spark discharge between the conductor and the wall of the fastener quite commonly cause breakdown of conventionally used insulating compositions so that a short circuit develops between the conductor and the head of the fastener, shunting the electric current so that it does not actuate the explosive charge; (b) since the conductor is merely inserted into an opening in the head of the fastener, detonation of the explosive charge forcefully ejects the electrode from the fastener as a missile and allows the detonation product gases to escape with an accompanying production of objectionable noice; (c) positioning the conductor within the cavity of the fastener is both tedious and time consuming; and (d) because the conductor of the device which is used to fire the fastener is exposed to the explosion, it is damaged and thus cannot be reused.

In accordance with this invention, there is now provided an explosively actuated, i.e., explosively expanded, fastener which is characterized by substantially instantantous response to a firing impulse, by high reliability and lack of noise, and by the ease with which it can be employed in assembly line manufacture. The high speed fastener of this invention comprises a body having a head portion and an electrically conductive shank portion depending (extending) from the head portion; a substantially axial recess (cavity) in said shank portion; an electrode extending through the head portion and terminating in said recess, said electrode having bare ends and being insulated from said shank portion; and a semiconductive explosive charge comprising a mixture of heat-sensitive detonating explosive such as lead azide and at least 4% (based on the total weight of the charge) of finely divided, i.e, powdered, electrically conductive material such as graphite, said charge bridging the internal bare end of said electrode and the wall of said recess thereby completing the integral fastener energizing circuit, and the electrical resistance of said circuit being at least about 1 ohm; the electrode being of such configuration, i.e., shape and dimensions, that it is not ejected upon initiation of the explosive charge, i.e., the electrode is retained in situ. For most fasteners, the heat-sensitive detonating explosive will contain lead azide in an amount equal to at least about 40% of the total weight of the explosive charge. Fasteners wherein the energizing circuit has a resistance of about from 10 to 200 ohms have proved most efficient from the standpoint of explosive power, requisite firing energy, and speed of response to firing current and thus constitute a preferred practical embodiment of the invention.

One feature of this invention is a conductive explosive mixture that not only will give fasteners having the required electrical resistance but also is characterized by its reliability in a wide variety of fasteners, the uniformity of fastener expansion it effects, the speed of its response to a range of practical firing energies, and the relative safety with which it can be handled during fastener manufacturing operations. Of proven utility in these respects is a uniform mixture of, by weight, (1) at least 50%, preferably at least 60%, finely diveded lead azide, and (2) about from 4 to 50%, preferably about from 10 to 30%, electrically conductive powder consisting essentially of amorphous carbon and 70 to 95% graphite. Where the fasteners are to be permanently sealed and/or constructed of one of the less ductile, conventional fastener materials such as 2017 aluminum alloy and Inconel X, it is desirable to have the lead azide/conductive powder mix contain up to about 15%, preferably at least 8% (based on the total weight of the explosive charge), of heat-sensitive explosive diluent such as tetracene or the complex salt of lead nitrate and the bis basic lead salt of 4,6-dinitro-o-cresol. Also, an inert diluent such as red lead ($Pb_3O_4$) can sometimes be employed.

Only one instance has been found where the above explosive charges were not ideally suited for use in fasteners contemplated by this invention. It has been discovered that in fasteners made of brass where the explosive charge is exposed to the atmosphere, i.e., the end of the cavity in the shank remains open after loading of the charge, and the fastener remains in storage for a considerable length of time, lead azide tends to react with the brass causing corrosion and formation of unstable copper azide, as well as changing the electrical characteristics of the charge. Where necessary, this problem is obviated by replacing the lead azide with nitromannite. Since nitromannite is about twice as powerful as lead azide, its concentration in the explosive charge will be about half that already given for lead azide with a corresponding increase in the total amount of other ingredients in the explosive charge.

While it is not desired that this invention be limited by theory, it is believed that the conductive particles dispersed in the explosive charge provide a plurality of conducting paths (bridges) of microscopic cross-section but measurable resistance between the conductor and the body of the fastener. The passage of electric current, usually of about from 100,000 to 500,000 ergs, against the resistance provided by these paths builds up sufficient heat to effect initiation of the heat-sensitive explosive charge within about 10 to 100 microseconds with the preferred explosive charges. For other explosive charges, the response may be slower, e.g., up to $\frac{1}{10}$ to $\frac{1}{5}$ second.

For ease in handling and loading the explosive mixture and to insure that it does not segregate during handling, the mixture preferably is grained with a graining agent, e.g., nitrocellulose, nitrostarch, a natural gum, alkyl celluloses, and/or silicon elastomers, or is combined with a combustible resinous binder. Although the graining agent or binder may constitute up to about 20% by weight of the total explosive charge, amounts in the range of about from 1 to 15% are preferred.

Another object of this invention is the provision of a fastener that can be energized without fouling or shorting the firing tool and without creating a hazard to the tool's operator. This requires that the central electrode be secured in the head portion of the fastener so that it will neither be ejected nor permit escape of gaseous detonation products upon initiation of the explosive charge. Although mechanical expedients such as threaded connections between the electrode and head portion can be visualized for this purpose, they increase significantly the cost of manufacturing the fastener. These problems have been solved for the fasteners of this invention by employing an electrode assembly comprising a peripherally insulated metal wire having bare end faces, which extends through a substantially axial bore in the head portion, is tightly peripherally engaged by the wall of said bore, and terminates in the cavity of the shank, the diameter of the electrode section within the head portion being substantially less than the diameter of the cavity, and the end of the electrode within the cavity being headed (i.e., enlarged) so that it is peripherally coextenstive with, and tightly peripherally engaged by, the cavity wall.

The embodiment of this invention which is particularly preferred for assembly line fastening operations is a fastener having the above internally headed electrode assembly, the previously described lead azide-based semiconductive explosive charge, and means permanently closing the normally open end of the cavity. Such a fastener is substantially noiseless, ventless and non-violent, has excellent shelf life, is easily and inexpensively manufactured, and responds instantly to firing energies capable of being delivered by light-weight, portable sources. Rivets of this design have been fired seriatim with a hand operated portable tool at a rate of sixty per minute. In this preferred embodiment the end of the shank opposite the head is open for loading of the fastener and subsequenly closed by closure means such as a cylindrical plug having a roughened or serrated lateral surface which digs into the inner walls of the recess when a portion of the shank is swaged to smaller diameter around the plug, or a spherical plug used in conjunction with a deformable spacer. The closure means muffles the sound of the detonation such that only a mild, innocuous clicking sound is heard upon detonation of the explosive instead of a report or loud noise normally associated with explosively actuated fasteners which are not so closed.

In yet another embodiment of this invention, which is particularly adapted for use with large fasteners, a supplemental charge, which may have a detonation velocity different than that of the detonating composition in the above explosive mixture, is provided in the recess adjacent to a thin layer of the semiconductive explosive charge, which, in this instance serves primarily as an ignition composition.

In order to describe the invention in greater detail, reference now is made to the accompanying drawings wherein:

FIGURE 1A is a partial sectional view on an enlarged scale of a rivet of this invention in position to fasten together two plates;

FIGURE 1B shows the same rivet in an expanded condition holding together the two plates;

FIGURES 2A, 2B, and 2C are views illustrating a method of contouring the central conductor of a fastener of this invention;

FIGURE 3 is an enlarged sectional view of a preferred electrode assembly of this invention;

FIGURE 4 is a sectional view of an explosively expandable bolt according to this invention; and FIGURE 5 is a sectional view of an explosive nail in accordance with this invention.

In FIGURE 1A, the rivet body has a head portion 1 and shank portion 2 of conductive material. The shank portion extends through aligned holes in plate members 3 and 4 which are to be joined. A central longitudinal recess or cavity 5 in the shank portion contains semiconductive explosive mixture 6 consisting essentially of lead azide and graphite. An opening (i.e., bore) 7 extends axially through the head portion into recess 5. A conductor 8 extends into recess 5 through opening 7. This conductor is insulated along its entire length by a flexible coating, e.g., of "Formvar" insulating resin about 1 mil thick, which is not affected by voltages of up to 500 volts and preferably not affected by voltages up to 900 volts. The ends of flattened head 8A and the exterior end of the electrode are bared of insulation. The recess of the rivet is closed by a serrated cylindrical plug 9. The outer end of the shank is simply swaged as at 10 to lock this plug in position.

FIGURE 1B illustrates the rivet of FIGURE 1A after it has been expanded by detonation of explosive charge 6 in recess 5. The expansion of the shank, indicated at 2′, firmly secures plates 3 and 4 between the expanded portion 2′ and rivet head 1.

FIGURES 2A, 2B, and 2C illustrate the successive operations performed to shape and seat an electrode when it has not been preformed in the appropriate configuration. A heading tool 11 of a material such as hardened steel is used to center insulated wire-like conductor 8 in opening 7. When the heading tool is forced toward the rivet head by an arbor press (mandrel press) as in FIGURE 2B with the other end of the conductor supported by die 11A, the wire is deformed and "expanded" in the head and recess of the rivet, thus becoming "headed"

within recess 5 and tightly peripherally engaged by the walls of the recess and opening (bore) 7, as shown in FIGURE 2C. It has often been found desirable to chamfer the exterior end of opening 7 to remove small burrs before inserting conductor 8. In such cases, heading as in FIGURE 2B will also cause expansion of the external end of the electrode within the chamfer. This has the additional advantage of providing a larger exterior electrode surface for contact with the electrode of the tool used to fire the fastener.

FIGURE 3 illustrates a preferred electrode assembly, which is made as in FIGURE 2A, B, and C, and is particularly suited for small fasteners, e.g., those having a nominal shank diameter of about ¼ inch or less. Electrode 8 has an insulating coating 8B about its periphery, and the cylindrical portion of 8 within rivet head 1 is of lesser diameter than the cylindrical portion of cavity 5. For most small fasteners such as rivets, which typically have a ratio of shank diameter to head thickness (axial distance from the top of the head to the cavity) of 4:1 to 2:1, the diameter of hole (i.e., bore) 7 should be less than 85% of the diameter of the cavity. The headed end of the electrode, which has substantially flat face 8A and is peripherally coextensive with the cavity wall, fills frusto-conical cavity section 5A as well as part of the adjacent cylindrical cavity. As seen in this figure, insulation 8B extends downward beyond face 8A. This results from the heading operation of FIGURE 2 and is desirable to prevent the fastener from having short circuits. The angle between frusto-conical section 5A and the axial center of the fastener (vertical axis in FIGURE 3) should be from 20 to 55°, with about 45° being ideal. At angles less than 20°, no way has been found to preclude electrode ejection in these small fasteners, except by increasing the volume of its headed end to the point where it occupies more of the cylindrical cavity than can be tolerated. When, however, the angle exceeds 55°, the edge where frusto-conical section 5A meets hole 7 cuts or tears insulation 8B during the heading operation causing the resulting fastener to short circuit. In addition, the volume of the electrode heads should be such that it more than fills section 5A, i.e., it extends into the adjacent cylindrical part of cavity 5, preferably a distance equal to at least about 3 times the length of section 5A. The length of this extension should be less than about 4.5 times the length of the frusto-conical section (measured along the axial center of the fastener) because the amount of pressure required to form an electrode head from a wire of greater length causes insulation failure and shorting, irrespective of the other precautions that are taken.

For example, with a permanently sealed rivet manufactured from a rivet blank of the configuration shown in FIGURE 2A and having a shank diameter of 0.134 in., head thickness of 0.045 in., hole 7 diameter of 0.033 in., a 45° frusto-conical cavity section 0.005 in. long, and adjacent such section, a cavity diameter of 0.041 in., the minimum length of 0.031 in. diameter insulated wire that can be headed as in FIGURE 2 to give a reliable non-ejecting electrode is 0.085 in., with 0.115 in. being optimum and 0.135 in. causing failure due to shorting. After heading, the wire 0.085 in, long fills hole 7 and has a length of 0.065 in., i.e., it extends into the cylindrical portion of the cavity 0.015 in., whereas the 0.135 in. long wire extends into the cylindrical cavity 0.0225 in.

In the explosively expandable bolt illustrated in FIGURE 4, a supplemental charge 13 of a detonating composition is provided in propagating relationship to the charge of conductive mixture in the recess 5. The use of the supplemental charge of greater energy output (power) than that of the semiconductive mixture 6 makes possible greater expanding action with the use of lesser amounts of explosive and accordingly minimizes the size of the recess required in the shank. Since the recess in the shank subtracts from the total strength of the shank, the smaller the volume of the recess, and particularly its diameter, the stronger will be the shank. The end of the shank opposite that in which the conductor extends is closed by a spacer element 14 of a readily deformable material and a spherical metal plug 15. In swaging the end of the shank in normal production procedures, the shank tends to "buckle" under the spherical plug, as at 10, thus furthering the effectiveness of the gas seal provided by the spacer and plug. The conductor is insulated by a threaded plug 12 of a relatively hard material, e.g., ceramic, glass, Bakelite or an epoxy resin, which mates with threads in the head of the metal fastener body.

FIGURE 5 shows an explosive nail of the invention which is characterized by a closure means having a pointed end 16 of hard material for puncturing the members to be fastened. The shank of the closure member is a serrated cylinder such as element 9 in FIGURE 1 and is firmly engaged in recess 5 by swaging at 10. The nail of FIGURE 5 is driven through the members to be fastened by a hammer element having a recess to accommodate the exposed end of electrode 8, thereby protecting it from damage; alternatively, the exposed end can be flush or recessed in a cavity in the head portion, the cavity preferably being of larger diameter than said end to permit easy connection of a voltage source to the electrode. This figure also illustrates a fastener having a long solid shank portion between the head and recess so that the shear strength of the shank is not weakened by the presence of recess 5 in the area of the interface of the members being fastened together.

The operation of each of the above fasteners is substantially the same. An electric discharge, which preferably is supplied by a 1 to 100 microfarad capacitor charged by a nominal 45–150 volt (D.C.) current, is applied to insulated conductor 8. The walls of the fastener surrounding recess 5 are grounded, thus serving as a larger electrode in the firing circuit. The conductive particles of graphite are believed to form microscopic conductive paths or bridges analogous to the bridgewire in electrically fired explosive initiator. The passage of electric current along the paths provided by the particles generates heat sufficient to ignite the detonating composition in intimate contact with these particles, subsequently bringing about detonation of this composition. The detonation shock expands the walls of the shank producing the bulging effect shown in FIGURE 1B. In the sealed fasteners, the closure means, e.g., the serrated plug of FIGURES 1A and 5 or the spacer and spherical plug of FIGURE 4, prevents the sudden escape of gases when the explosive charge is initiated so that only a mild, innocuous clicking sound is heard.

Although the lead azide used in the preferred explosive mixtures may be of any of the conventional types, dextrinated lead azide is least sensitive to impact and static and thus is preferred from the standpoint of safety during manufacture, storage and use. Dextrinated lead azide contains about 8% dextrin by weight, which should not be considered "lead azide" when formulating explosive charges having the lead azide contents prescribed above. The various types of lead azide are discussed in greater detail on pages A557–563, The Encyclopedia of Explosives and Related Items, vol. 1, published by Picatinny Arsenal, Dover, N.J. in 1960. The mean particle size of the lead azide should be about from 1 to 100 microns and preferably will be from about 20 to 40 microns.

The conductive particles interspersed in the detonating explosive to form miniature conductive paths preferably will consist of a mixture of graphite and an amorphous carbon, typically one having a resistivity of about from 10 to 150 ohm-cm. Suitable forms of carbon include channel black, furnace combustion blacks, furnace thermal blacks, acetylene black and lampblack. Of these, a particularly preferred form of amorphous carbon is an oil furnace combustion black having a resistivity of 10 to 30 ohm-cm. such as commercially available as "Vulcan" XC–72R extra-conductive furnace black from Cabot Corp. The oil furnace blacks have a high degree of permanent chain structure and low volatility generally associated with low resistivity values. The use of amorphous carbon in admixture with graphite, preferably micronized graphite, is a desirable means to regulate the electrical resistance of the explosive charge and time required for its actuation. The amorphous carbon increases the conductivity of the charge mixtures so that it is actuated in shorter times and by lower firing energies than those free of amorphous carbon. However amorphous carbon is bulky and dimensional restrictions usually restrict the proportions used to about from 5 to 30% by weight of the conductive particles. The particles of graphite will generally have a particle size of 200 mesh to submicron, and micronized graphite which has a particle size of about from 2 to 10 microns is preferred. The amorphous carbon will generally have an average particle diameter of about from 15 to 60 microns, and preferably 15 to 30 microns. Small particles of oil furnace black, e.g., the "Vulcan" XC–72R, give more conductive explosive mixtures than channel blacks of equivalent particle size.

Although the percentage of conductive particles, i.e., the mixture of graphite and amorphous carbon, can in general vary about from 4 to 50% by weight to give conductive explosive charges having a resistance (as measured in the fastener) of 1 ohm to 1 megohm, an optimum combination of firing characteristics and explosive power for use in fasteners such as alloy aluminum rivets having a shank diameter of about ⅛ to ¼ inch is obtained when the conductive particles comprise about from 10 to 30% of the charge. Successful firings have occurred in fasteners having resistances ranging from 1 ohm to 1 megohm using a 3 to 20 μfd. capacitor charged to 90 to 45 volts, respectively, however, it is preferred that the fasteners have the resistance of 10 to 200 ohms provided by the compositions containing about from 10 to 30% conductive particles. When the proportion of conductive particles exceeds about 50%, the mixture becomes excessively conductive and weaker explosively. When the content of conductive particles in the mixture is below about 4%, the conductivity is so reduced that excessively high voltages are required to fire the fastener.

A particularly preferred explosive composition which gives outstanding overall performance in rivets formed of 2017 aluminum alloy consists of a 65/13/16/2/4 mixture of dextrinated lead azide, tetracene, micronized graphite, "Vulcan" XC–72R oil furnace black, and nitrostarch, respectively.

The loading (quantity) of semiconductive mixture in recess 5 will, of course, depend upon the thickness and shear strength of the fastener walls around the recess, overall shank diameter, the requisite degree of shank expansion, the amount of explosive in the semiconductive mixture, and the compacted density of the mixture.

The particles within the explosive charge will be mechanically intermixed to a sufficient degree to assure that it is of substantially homogeneous composition throughout. This degree of intermixing can conveniently be effected by slurry mixing in solvents such as alcohols, ketones, or esters and evaporation of the solvent before graining the mixture through silk bolting cloths or other suitable screen material. Caution should be taken to avoid milling which would unduly sensitize the mixture.

Although the pressure used for compacting the semiconductive explosive mixture and optional supplemental charge is not critical, pressures of at least about 10,000 p.s.i. will generally be used. Usually, compaction is done in at least two stages. For fasteners having a recess on the order of about 0.060 inch in diameter or less, the particulate charge is loaded into the recess, pressure exerted to compact the charge to an uniform, predetermined height, and subsequent pressure, preferably of about 17,000 to 36,000 p.s.i., applied. Compacting promotes intimate contact between the particles of detonating composition and conductive material and increases the number of contacts between conductive particles, thereby increasing the number of conductive paths between conductor and fastener body. Compaction also results in close contact between the mixture and the side walls of the recess thereby giving greater uniformity of performance and reliability of the fastening elements of this invention.

Alternatively, the components of the charge can be distributed homogeneously throughout a resinous binder to form a unitized charge which can be loaded into the recess of the fastener body without need for the multiple stage compaction. One compaction step at a pressure described above will normally be employed. A particularly suitable resinous binder is an air-cured one-component silicone rubber adhesive/sealant such as the Dow Corning 92–018. Other binders which can be used include fluorocarbons such as "Viton" or "Teflon," polyvinyl acetate, polyvinyl chloride, polyvinyl fluoride, polyvinylidene fluoride, polyamides (nylon), epoxy resins, and other similar resinous compositions which will not detrimentally affect the other components of the explosive mixture. The resistance (resistivity) of the unitized charge wherein the conductive explosive mixture is dispersed in the resinous binder should be as set forth above. The binder will comprise up to 20% and preferably 1 to 15% of the total composition.

As stated earlier, the ignition assembly of this invention utilizes a conductor inserted through the head of the fastener. This conductor may be of any of the commonly used electrically conductive materials (metals) such as copper, brass, bronze, silver, gold, aluminum, anodized aluminum, zinc, steel, Hastelloy metal, nickel and alloys of any of the above. The lateral (i.e., peripheral) surface of the conductor is surrounded by a layer of an electrically nonconductive material which will not break down upon the application of an electric current having the requisite voltage. An adequate safety factor is provided by resistance to at least 500 volts, preferably, however, the insulation will not break down upon the applications of voltages of 900 or more. Suitable insulating materials include plastics and resins such as polyvinyl formal resins ("Formvar"), Bakelite, acetal resins, polytetrafluorethylene, ceramics and glass, the flexible insulating materials being required when the heading operation of FIGURE 2 is to be performed.

Although the conductor may protrude from the head of the fastener to provide a guide for quickly positioning a fastener-firing device, the flush arrangement of FIGURES 1–4 is preferred because it eliminates the necessity of subsequently peening the conductor to knock it flush with the exterior surface of the fastener head.

Escape of gas from the shank end of the fastener is precluded by closure means. This closure means may be an integral part of the rivet body, but, preferably, for ease in loading is a cylindrical, serrated plug, a spherical plug and resilient spacer, or similar means swaged into place. The closure means used for noiseless rivet functioning are discussed more completely in U.S. Patents 2,807,184 to R. J. Miller, and 2,956,469 to J. B. Barbeau et al. Similar closure elements can be employed in fastening devices of other designs.

It will be understood that many different sizes and configurations of fasteners may be provided in accordance with the teachings of this invention. The body of these fasteners may be of any of the common metals which have the properties of strength and malleability adapted to make them serviceable for such use. Brass, bronze, aluminum, nickel and iron alloys are examples of suitable metals. In general, the conductor and the rivet body will be of the same material to preclude significant electromotive reaction between the body and the conductor.

The following examples illustrate embodiments of the invention, the embodiment of Example 1 being preferred.

*Example 1*

One hundred explosive rivets are prepared using rivet blanks (2017 aluminum alloy) similar to that shown in FIGURE 2A. In each rivet, the shank is 0.134 inch in outer diameter and 0.290 inch long and the mushroom-shaped head is 0.250 inch in outer diameter at the section connected to the shank and 0.045 inch thick. The recess extending the length of the shank is stepped, being 0.040 inch in minor diameter at a section adjacent the head and 0.060 inch in major diameter. The frusto-conical cavity section at the end of the recess is 0.005 inch long and its walls slope at 45° with respect to the axis of the blank. With the stepped recess design, not only is there explosive in the larger diameter portion that acts to bulge the walls of the rivet body to hold panels together on actuation of the explosive charge, but there is also explosive in the narrower portion close to the rivet head that bulges the rivet body into tight connection with the panels joined by the rivet. A bore 0.033 inch in diameter extends vertically through the head of the blank, the bore being coaxial with the longitudinal axis of the rivet blank, i.e., centered in the mushroom-shaped head. An electrode of aluminum, 0.115 inch long and 0.031 inch in outer diameter, including a 1 mil thick coating of "Formvar" polyvinyl-methylal resin, is inserted into the bore and set in place by the technique described in connection with FIGURE 2, with the rivets heads down, to give an electrode assembly as shown in FIGURE 3, the diameter of the substantially flat end face (8A) being 0.038 inch (i.e., exclusive of insulation). The rivet is loaded from the open end with 16 milligrams of a mixture consisting by weight of 65% dextrinated lead azide, 16% micronized graphite, 4% nitrostarch, 13% tetracene, and 2% oil furnace black (Cabot's "Vulcan" XC–72R). The mixture is pressed first lightly to force it into the smaller diameter portion of the recess and subsequently by a flat-faced 0.058 inch D press pin at about 35,000 p.s.i. to set the charge in place. The mean particle size of the dextrinated azide is about 25 microns and the particle size of the micronized graphite is 2 to 10 microns. The furnace black has a particle size of about 29μ, and the resistance of the rivets is 20 to 50 ohms. A rubber spacer (0.040 inch thick and 0.060 inch in diameter) is set on top of and in contact with the explosive composition and then a spherical plug of soft carbon steel (0.055 inch diameter) is positioned in contact with the spacer. The walls of the rivet blank in the section about the plug and spacer are subsequently swaged to reduce the diameter of the rivet shank around the spacer and spherical plug.

The rivets are positioned in predrilled holes in an 80 mil thick plate and individually fired by a gun which grounds the rivet body and discharges to the central electrode the current stored by a 20 microfarad condenser charged by a 90 volt (D.C.) current. The explosive charge in the rivet is actuated within 50 microseconds and expands the shank of the rivet by about 23 to 24%. All of the rivets remain sealed at each end after firing.

*Example 2*

Rivets (ten) are prepared as in Example 1 except that the explosive charge is a unitized charge comprising, by weight, 70% dextrinated lead azide, 16% micronized graphite, 2% oil furnace black ("Vulcan" XC–72R), and 12% silicone rubber binder (Dow-Corning 92–018), which is pre-pressed into 0.040 inch diameter, 0.10 inch long cylindrical pellets weighing 5.5 mg. each and then inserted into the recess of the rivet bodies. The pellet is pressed at 10,000 p.s.i. by a 0.058 inch-diameter flat press pin thereby filling the 0.04 inch and part of the 0.06 inch diameter cavity sections. The extremity of the rivet body is then closed by a rubber spacer and spherical plug of soft carbon steel as in Example 1. Rivets containing the unitized charge have an average resistance of 14 ohms and are individually fired by the current stored by a 20 μfd. condenser charged by a 90 volt (D.C.) battery within 50 microseconds and the charge expands the shank of the rivet by about 20 to 25% without venting at either end of the rivet body.

*Example 3*

Rivets are prepared as in Example 1, except the explosive charge is a 80/12/2 mixture, by weight of dextrinated lead azide, micronized graphite, and nitrostarch, respectively. These rivets are individually fired within 50 microseconds by the discharge from a 20 microfarad condenser charged by a 90 volt (D.C.) current and the charge expands the shank of each rivet by 23 to 24% without venting at the head or shank end of the rivet body.

The actuation of the explosive mixture within 50 microseconds as illustrated in the above examples is a particularly advantageous feature of fasteners of this invention since functioning within this time, which is for all practical purposes instantaneous, enables the fastener to be "touch" fired by a tool, i.e., the operator merely touches the central electrode of the fastener with the firing tool and then moves on to the next fastener. Aside from this if the explosive composition is not actuated within about 100 microseconds or less by the firing pin designed to fire the explosive charge, and in some cases also to peen the electrode flush with the fastener head, undesirable short circuits develop in the fastener head without actuating the explosive charge. Peening of the electrode simultaneous with actuation of the explosive charge in the fastener is desirable where the electrode originally protrudes as in FIGURE 5, and a smooth, sealed surface is wanted at the fastener head without undertaking a separate polishing or sanding operation.

The teachings of this invention may be used in large fasteners which may be of a nonmetallic, or otherwise nonconductive, composition by charging the conductive mixture into a cylindrical metal shell or tube and introducing this shell into a cavity in the device. In this event, the electrically conductive shell or tube is the electrically conductive shank portion of the fastener. Obviously, in this embodiment, a means for grounding the metal shell must be provided.

I claim:

1. An explosively expandable fastener comprising a body having a head portion and an electrically conductive shank portion extending from the head portion; a substantially axial cavity in said shank portion; a bore of substantially lesser diameter than the cavity, extending substantially axially through the head portion and communicating with said cavity; a peripherally insulated metal wire electrode having bare end faces, extending through said bore in the head portion and terminating in said cavity, the length of electrode within the head portion being tightly peripherally engaged by the wall of said bore, and the end of the electrode within the cavity being enlarged so that it is peripherally coextensive with and tightly peripherally engaged by the cavity wall; and a semiconductive explosive charge comprising a mixture of heat-sensitive detonating explosive and at least 4%, by weight, of finely divided electrically conductive material, said charge bridging the internal bare end face of said electrode and the wall of said cavity thereby completing the integral fastener energizing circuit, the electrical resistance of said circuit being at least about 1 ohm; and the configuration of said electrode being such that it is retained in situ upon initiation of the explosive charge.

2. A fastener of claim 1 wherein the wall of the cavity tapers outwardly from the internal end of said bore until it meets a substantially cylindrical section of said cavity, and the internal end of the electrode extends into, and is peripherally coextensive with, said cylindrical section.

3. A fastener of claim 1 wherein the semiconductive explosive charge consists essentially, by weight, of graphite and at least 40% lead azide.

4. A fastener as in claim 1 wherein a supplemental charge of detonating explosive is provided in the cavity adjacent to the semiconductive explosive mixture.

5. A fastener as in claim 1 wherein noise baffling means closes the extremity of the shank opposite the head portion.

6. A fastener as in claim 1 wherein the external bare end of said electrode is flush with the exterior surface of the head portion.

7. An explosively expandable fastener comprising a metal body having a head portion and a shank portion extending from the head portion; a cavity in said shank portion, said cavity having a frusto-conical section whose larger diameter end opens into a cylindrical cavity section and whose smaller diameter end is contiguous to said head portion; a cylindrical bore of substantially lesser diameter than said cylindrical section of the cavity, extending through the head portion and opening into the smaller diameter end of said frusto-conical section, said bore, cavity and fastener body being substantially coaxially aligned; a peripherally insulated metal electrode having substantially flat bare end faces, extending through said bore in the head portion and terminating in said cavity, the length of electrode within the head portion being tightly peripherally engaged by the wall of said bore, and the end of the electrode within the cavity being enlarged so that it is peripherally coextensive with and tightly peripherally engaged by the cavity wall; and a semiconductive explosive charge comprising a mixture of heat-sensitive detonating explosive and at least 4%, by weight, of finely divided electrically conductive material, said charge bridging the internal bare end face of said electrode and the wall of said cavity thereby completing the integral fastener energizing circuit, the electrical resistance of said circuit being at least about 1 ohm; and the configuration of the electrode being such that it is retained in situ upon initiation of the explosive charge.

8. A fastener of claim 7 having a nominal shank diameter of up to about ¼ inch and a ratio of shank diameter to head thickness of from 4:1 to 2:1; and wherein the diameter of the bore is less than 85% of the diameter of said cylindrical cavity section, the wall of the frusto-conical section forms an angle of from 20 to 55° with the axis of the cavity, and the enlarged internal end of the electrode fills the frusto-conical section and extends into the adjacent cylindrical section of the cavity a distance of from about 3 to 4.5 times the length of the frusto-conical section.

9. A fastener of claim 8 wherein the end of the shank opposite the head portion is sealed by closure means tightly engaged by the cavity wall below the semiconductive explosive charge.

10. A fastener of claim 8 wherein the semiconductive explosive charge consists essentially, by weight, of a homogeneous mixture of (1) at least 50% finely divided lead azide and (2) about from 4 to 50% electrically conductive powder consisting essentially of amorphous carbon and 70 to 95% graphite, and the electrical resistance of said circuit is about from 10 to 200 ohms.

11. A fastener of claim 10 wherein the semiconductive explosive charge contains about from 8 to 15% tetracene, at least 60% lead azide and about from 10 to 30% electrically conductive powder.

References Cited

UNITED STATES PATENTS

| | | | |
|---|---|---|---|
| 1,400,401 | 12/1921 | Allan | 85—37 |
| 2,293,373 | 8/1942 | Von Herz et al. | 85—65 |
| 2,865,726 | 12/1958 | Jenkins et al. | 149—35 |
| 2,918,871 | 12/1959 | Taylor | 102—28 |
| 2,956,469 | 10/1960 | Barbeau et al. | 85—65 |
| 3,096,714 | 7/1963 | McLellan Yuill | 102—28 |
| 3,125,954 | 3/1964 | Vilbajo | 102—28 |
| 3,155,553 | 11/1964 | Taylor et al. | 102—28 |
| 3,182,592 | 5/1965 | Barocca | 102—28 |

FOREIGN PATENTS

| | | |
|---|---|---|
| 739,557 | 9/1943 | Germany. |
| 89,450 | 6/1937 | Sweden. |

OTHER REFERENCES

Bebie, J.: Explosives, Military Pyrotechnics and Chemical Warfare Agents, N.Y., The Macmillan Co., 1943, TP270B37, p. 144.

CARL W. TOMLIN, *Primary Examiner.*

M. PARSONS, JR., *Assistant Examiner.*